US009830991B2

(12) United States Patent
Lai (10) Patent No.: US 9,830,991 B2
(45) Date of Patent: Nov. 28, 2017

(54) NON-VOLATILE MEMORY (71) Applicant: eMemory Technology Inc., Hsin-Chu (TW)

(72) Inventor: Tzu-Neng Lai, Nantou County (TW)

(73) Assignee: EMEMORY TECHNOLOGY INC., Hsin-Chu (TW)

(*) Notice: Subject to any disclaimer, the term of this patent is extended or adjusted under 35 U.S.C. 154(b) by 0 days.

(21) Appl. No.: 15/366,199

(22) Filed: Dec. 1, 2016

(65) Prior Publication Data
US 2017/0206965 A1    Jul. 20, 2017

Related U.S. Application Data (60) Provisional application No. 62/280,137, filed on Jan. 19, 2016.

(51) Int. Cl.
| G11C 11/34 | (2006.01) |
| G11C 16/06 | (2006.01) |
| G11C 16/04 | (2006.01) |
| G11C 16/08 | (2006.01) |
| G11C 16/26 | (2006.01) |
| G11C 16/24 | (2006.01) |
| G11C 16/32 | (2006.01) |

(52) U.S. Cl.
CPC .......... G11C 16/0408 (2013.01); G11C 16/08 (2013.01); G11C 16/24 (2013.01); G11C 16/26 (2013.01); G11C 16/32 (2013.01)

(58) Field of Classification Search
CPC ..... G11C 16/0408; G11C 16/08; G11C 16/26; G11C 16/24; G11C 16/32
See application file for complete search history.

(56) References Cited

U.S. PATENT DOCUMENTS

| 4,800,304 | A | 1/1989 | Takeuchi |
| 4,825,410 | A | 4/1989 | Lee |
| 2002/0054527 | A1 | 5/2002 | Kim et al. |
| 2010/0246293 | A1 | 9/2010 | Dudeck et al. |
| 2012/0008424 | A1* | 1/2012 | Lim ........................ G11C 16/26 365/189.05 |
| 2012/0120750 | A1* | 5/2012 | Kubouchi .............. G11C 17/18 365/203 |
| 2013/0021853 | A1* | 1/2013 | Yoo ........................ G11C 16/06 365/189.05 |
| 2013/0077381 | A1* | 3/2013 | Kwon ...................... G11C 5/02 365/148 |
| 2013/0206959 | A1* | 8/2013 | Zhang .................... H04N 5/361 250/208.1 |

(Continued)

OTHER PUBLICATIONS

Taiwan Intellectual Property Office, "Office Action" dated Aug. 21, 2017, Taiwan.

Primary Examiner — Toan Le
(74) Attorney, Agent, or Firm — WPAT, PC (57) ABSTRACT

A non-volatile memory includes a memory array and a controlling circuit. The memory array includes plural word lines and plural bit lines. The controlling circuit includes a processing circuit, a decoder, a driver, a timing controller and a sense amplifier. The decoder is connected with the processing circuit. The driver is connected with the decoder and the plural word lines. The timing controller is connected with the processing circuit. The sense amplifier is connected with the decoder, the timing controller and the plural word lines.

12 Claims, 5 Drawing Sheets

(56) References Cited

U.S. PATENT DOCUMENTS

| | | | |
|---|---|---|---|
| 2015/0279473 A1* | 10/2015 | Yoo | G11C 16/20 365/185.18 |
| 2016/0172012 A1* | 6/2016 | Lim | G11C 7/20 365/189.05 |
| 2016/0247580 A1* | 8/2016 | Chen | G11C 17/18 |

* cited by examiner

FIG. 5

NON-VOLATILE MEMORY

This application claims the benefit of U.S. provision application Ser. No. 62/280,137, filed Jan. 19, 2016, the subject matter of which is incorporated herein by reference.

FIELD OF THE INVENTION

The present invention relates to a non-volatile memory, and more particularly to a non-volatile memory with a timing controller.

BACKGROUND OF THE INVENTION

Generally, a non-volatile memory comprises a memory array. The memory array consists of plural memory cells. In addition, each memory cell has a floating gate transistor.

The non-volatile memory further comprises a controlling circuit for controlling a program operation, a read operation or an erase operation of the memory array.

When the non-volatile memory performs various operations, the controlling circuit issues the corresponding signals to the memory array. If the timing sequences of these signals are erroneous, the operations fail.

SUMMARY OF THE INVENTION

An embodiment of the present invention provides a non-volatile memory. The non-volatile memory includes a memory array and a controlling circuit. The memory array includes plural word lines and plural bit lines. The controlling circuit is connected with the plural word lines and the plural bit lines. The controlling circuit includes a processing circuit, a decoder, a driver, a timing controller and a sense amplifier. The processing circuit generates a read command according to a signal edge of a clock signal. The decoder is connected with the processing circuit. The decoder receives the read command and generates an address signal. The driver connected with the plural word lines, and activates one of the plural word lines according to the address signal. The timing controller is connected with the processing circuit. When the processing circuit generates the read command, the timing controller generates a precharge signal and a reset signal sequentially. The sense amplifier is connected with the plural bit lines. When the precharge signal is activated, the sense amplifier pre-charges the plural bit lines to a first predetermined voltage. When the reset signal is activated, the sense amplifier determines a selected bit line set from the plural bit lines and adjusts the selected bit line set to a second predetermined voltage. The decoder includes a first type device. The timing controller includes the first type device and a second type device.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
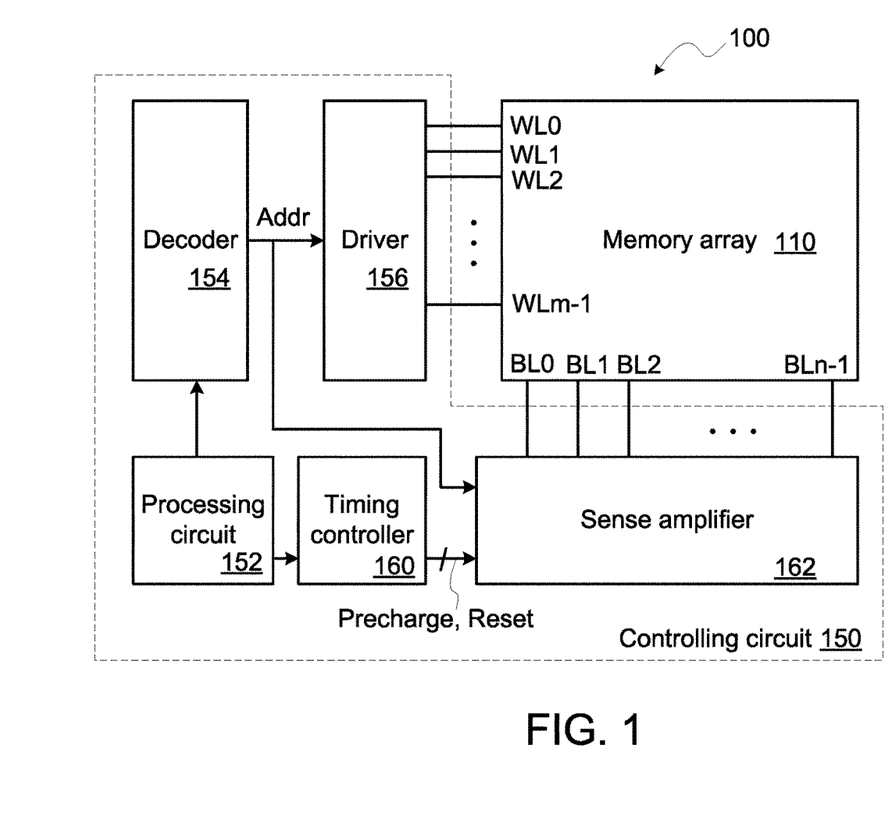
FIG. 1 is a schematic functional block diagram illustrating a non-volatile memory according to an embodiment of the present invention.

FIG. 1 is a schematic functional block diagram illustrating a non-volatile memory according to an embodiment of the present invention. As shown in FIG. 1, the non-volatile memory 100 comprises a memory array 110 and a controlling circuit 150. The controlling circuit 150 comprises a processing circuit 152, a decoder 154, a driver 156, a timing controller 160 and a sense amplifier 162.

The processing circuit 152 is connected with the decoder 154. The decoder 154 is connected with the driver 156 and the sense amplifier 162. The processing circuit 152 is also connected with the timing controller 160. The timing controller 160 is connected with the sense amplifier 162.

The memory array 110 comprises m word lines WL0~WLm−1 and n bit lines BL0~BLn−1. The driver 156 is connected with the word lines WL0~WLm−1 of the memory array 110. The sense amplifier 162 is connected with the bit lines BL0~BLn−1 of the memory array 110.

A read operation of the non-volatile memory 100 will be described as follows. Generally, the non-volatile memory 100 is operated according to a clock signal CLK. When the read operation is performed, the processing circuit 152 issues a read command to the decoder 154. After the read command is decoded by the decoder 154, an address signal Addr is generated. According to the address signal Addr, the driver 156 activates a specified word line of the m word lines WL0~WLm−1. Moreover, according to the address signal Addr, the sense amplifier 162 determines a selected bit line set from the n bit lines BL0~BLn−1 and senses the selected bit line set. Consequently, a read data is generated.

For example, the driver 156 activates the word line WL1 according to the address signal Addr. Consequently, the n memory cells of the memory array 110 connected with the word line WL1 are driven. Moreover, the n memory cells that are connected with the word line WL1 are connected with the n bit lines BL0~BLn−1, respectively.

If the sense amplifier 162 determines the bit lines BL0~BL7 as the selected bit line set according to the address signal Addr, the sense amplifier 162 senses the voltage changes of the bit lines BL0~BL7. Consequently, the read data in response to the logic levels of the bit lines BL0~BL7 is generated. That is, the read data indicates the storage states of the first eight memory cells that are connected with the word line WL1.

Moreover, the timing controller 160 generates a precharge signal Precharge and a reset signal Reset. While the decoder 154 generates the address signal Addr, the sense amplifier 162 has to activate the bit lines according to the precharge signal Precharge and the reset signal Reset. Consequently, the read data can be accurately generated.

Figure 2A:
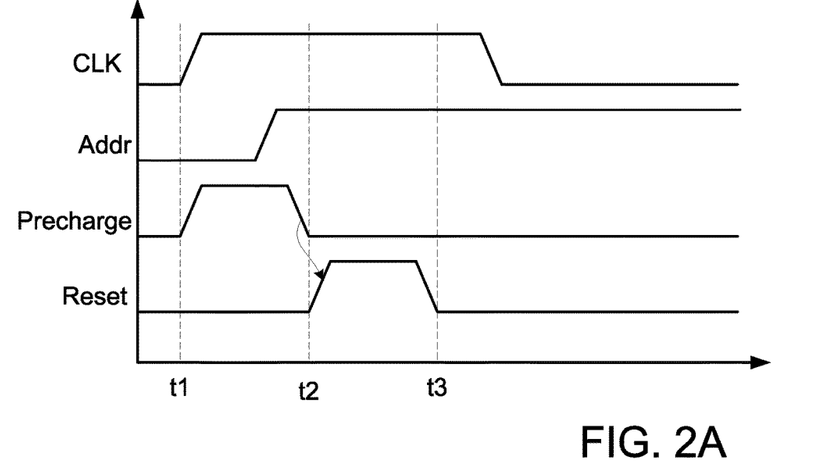
FIG. 2A is a schematic timing waveform diagram illustrating associated signals of the non-volatile memory according to the embodiment of the present invention.
Figure 2B:
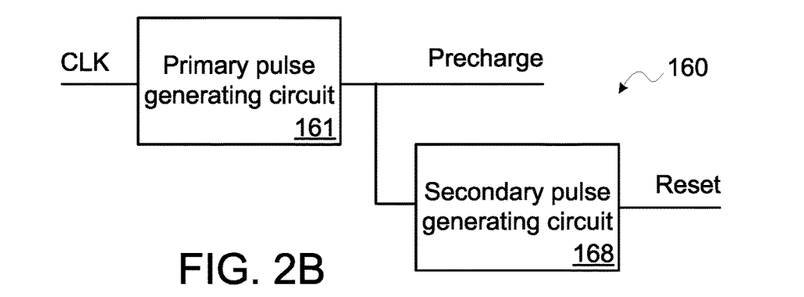
FIG. 2B is a schematic circuit diagram of the timing controller of the non-volatile memory according to the embodiment of the present invention.
Figure 2C:
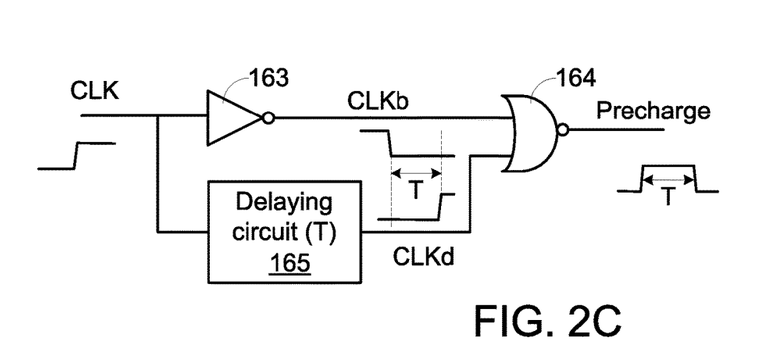
FIG. 2C is a schematic circuit diagram illustrating a primary pulse generating circuit of the timing controller of FIG. 2B.

FIG. 2A is a schematic timing waveform diagram illustrating associated signals of the non-volatile memory according to the embodiment of the present invention. FIG. 2B is a schematic circuit diagram of the timing controller of the non-volatile memory according to the embodiment of the present invention. FIG. 2C is a schematic circuit diagram illustrating a primary pulse generating circuit of the timing controller of FIG. 2B.

Please refer to FIG. 2A. At the time point t1 corresponding to a rising edge of the clock signal CLK, the processing circuit 152 issues a read command to the decoder 154, and the processing circuit 152 controls the timing controller 160 to generate the precharge signal Precharge to the sense amplifier 162.

The time interval between the time point t1 and the time point t2 is a precharge period. At the time point t1, the timing controller 160 generates a pulse of the precharge signal Precharge to the sense amplifier 162. A pulse width of the precharge signal Precharge is equal to the precharge period.

In the precharge period, the decoder 154 decodes the read command and generates the address signal Addr. According to the precharge signal Precharge, the sense amplifier 162 pre-charges all of the bit lines BL0~BLn−1 to a first predetermined voltage within the precharge period. In an embodiment, the precharge period is 10 ns, and the first predetermined voltage is 3.0V.

The time interval between the time point t2 and the time point t3 is a reset period. At the time point t2 corresponding to a falling edge of the precharge signal Precharge, the timing controller 160 generates a pulse of the reset signal Reset to the sense amplifier 162. The pulse width of the reset signal Reset is equal to the reset period.

In the reset period, the sense amplifier 162 determines a selected bit line set from the n bit lines BL0~BLn−1 according to the address signal Addr. In addition, the selected bit line set is reset to a second predetermined voltage by the sense amplifier 162. The voltages of the unselected bit lines are maintained at the first predetermined voltage. In an embodiment, the reset period is 10 ns. The second predetermined voltage is different from the first predetermined voltage. For example, the second predetermined voltage is equal to a ground voltage.

The period after the time point t3 is a developing and sensing period. In the developing and sensing period, the memory cells connected with the selected bit line set generate cell currents to the sense amplifier 162. According to the storage states of the memory cells, the cell currents with different magnitudes are used as the charge currents.

Consequently, in the developing and sensing period, the voltage at the selected bit line set is gradually changed from the second predetermined voltage (e.g., the ground voltage). According to the voltage changes of the bit lines of the selected bit line set, the sense amplifier 162 determines the logic levels of the bit lines of the selected bit line set. The logic levels indicate the read data.

Please refer to FIG. 2B. As mentioned above, the timing controller 160 is used for generating the precharge signal Precharge and the reset signal Reset. In this embodiment, the timing controller 160 comprises a primary pulse generating circuit 161 and a secondary pulse generating circuit 168.

The primary pulse generating circuit 161 receives the clock signal CLK and generates the precharge signal Precharge according to the rising edge of the clock signal CLK. The secondary pulse generating circuit 168 receives the precharge signal Precharge and generates the reset signal Reset according to the falling edge of the precharge signal Precharge. Consequently, the timing controller 160 generates a pulse of the precharge signal Precharge and a pulse of the reset signal Reset sequentially.

An example of the primary pulse generating circuit 161 is shown in FIG. 2C. The primary pulse generating circuit 161 comprises a logic circuit and a delaying circuit 165. The logic circuit comprises a NOT gate 163 and a NOR gate 164. The NOT gate 163 receives the clock signal CLK and generates an inverted clock signal CLKb. The delaying circuit 165 receives the clock signal CLK. After the clock signal CLK is delayed for a delay time T by the delaying circuit 165, a delayed clock signal CLKd is generated. The NOR gate 164 receives the inverted clock signal CLKb and the delayed clock signal CLKd, and generates the precharge signal Precharge. The pulse width of the precharge signal Precharge is equal to the delay time T. Similarly, the secondary pulse generating circuit 168 uses a logic circuit and a delaying circuit to generate the reset signal Reset. The circuitry of the secondary pulse generating circuit 168 is similar to the circuitry of the primary pulse generating circuit 161, and is not redundantly described herein.

Generally, the memory array 110 needs a higher operation voltage. That is, the decoder 154 and the driver 156 are semiconductor devices capable of withstanding the high voltage stress. For example, the decoder 154 and the driver 156 comprise PMOS transistors and NMOS transistors capable of withstanding the high voltage stress. Whereas, the timing controller 160 and the sense amplifier 162 are semiconductor devices capable of withstanding the low voltage stress. For example, the timing controller 160 and the sense amplifier 162 comprise PMOS transistors and NMOS transistors capable of withstanding the low voltage stress.

By the semiconductor manufacturing process, two types of semiconductor devices can be fabricated. The first type of the semiconductor device is called an I/O device capable of withstanding the high voltage stress. That is, the I/O device needs a higher operation voltage (e.g., 6V). The second type of the semiconductor device is called a core device capable of withstanding the low voltage stress. That is, the core device needs a lower operation voltage (e.g., 1.2V). That is, the I/O device and the core device are connected with different power domains.

Moreover, the process variation of the semiconductor manufacturing process may result in different operation speeds of the semiconductor devices. If the semiconductor device has a faster operation speed, the process variation is referred as a fast-fast corner (FF corner). If the semiconductor device has a typical operation speed, the process variation is referred to as a typical-typical corner (TT corner). If the semiconductor device has a slower operation speed, the process variation is referred to as a slow-slow corner (SS corner).

The operation speeds of the NMOS transistor and PMOS transistor with the TT corner meet the requirements of the designer. The operation speeds of the NMOS transistor and PMOS transistor with the FF corner are faster than the designed values. The operation speeds of the NMOS transistor and PMOS transistor with the SS corner are slower than the designed values.

In the controlling circuit 150 of the non-volatile memory 100, the decoder 154 and the driver 156 comprise I/O devices, and the timing controller 160 and the sense amplifier 162 comprise core devices. However, the I/O devices with the SS corner may result in a failed read result of the non-volatile memory 100. The reason will be described in more details as follows.

Figure 3:
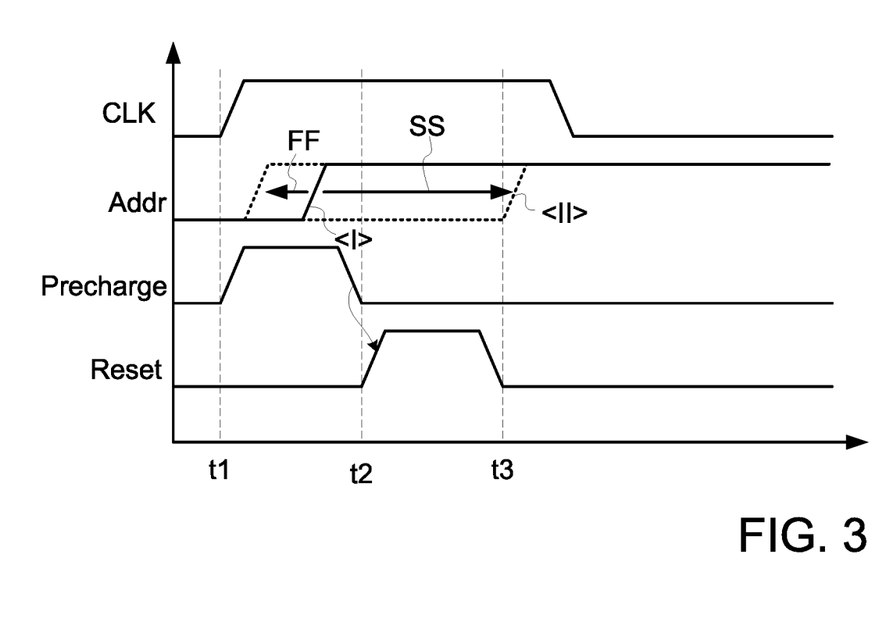
FIG. 3 is a schematic timing waveform diagram illustrating associated signals of the non-volatile memory when the process variation of the semiconductor manufacturing process occurs.

FIG. 3 is a schematic timing waveform diagram illustrating associated signals of the non-volatile memory when the process variation of the semiconductor manufacturing process occurs.

In case that the I/O devices of the decoder 154 have the TT corner, the address signal Addr is activated by the decoder 154 within the precharge period (t1~t2). For example, the curve <I> indicates the activation of the address signal Addr.

In case that the I/O devices of the decoder 154 have the FF corner, the timing of activating the address signal Addr is earlier. In case that the I/O devices of the decoder 154 have the SS corner, the timing of activating the address signal Addr is later.

During the normal operation, the decoder 154 generates the address signal Addr within the precharge period. Moreover, within the reset period, the sense amplifier 162 determines the selected bit line set and resets the selected bit line set to the second predetermined voltage according to the address signal Addr. In the developing and sensing period, the sense amplifier 162 generates the read data.

Generally, it is difficult to precisely control the process variation of the semiconductor manufacturing process. In case that the I/O devices of the decoder 154 have the SS corner, the address signal Addr may be activated by the decoder 154 after the reset period. For example, the curve <II> indicates the activation time of the address signal Addr after the reset period. In the reset period, the selected bit line set determined by the sense amplifier 162 is erroneous because the address signal Addr is not generated. Consequently, the sense amplifier 162 generates the erroneous read data in the developing and sensing period and results in a failed read result of the non-volatile memory 100.

As mentioned above, the process variation may result in the failed read result of the non-volatile memory 100. In case that the I/O devices of the decoder 154 have the SS corner, the decoder 154 may not generate the address signal Addr within the precharge period. Moreover, since the timing controller 160 is unable to respond to the process variation, the failed read result is generated.

Figure 4A:
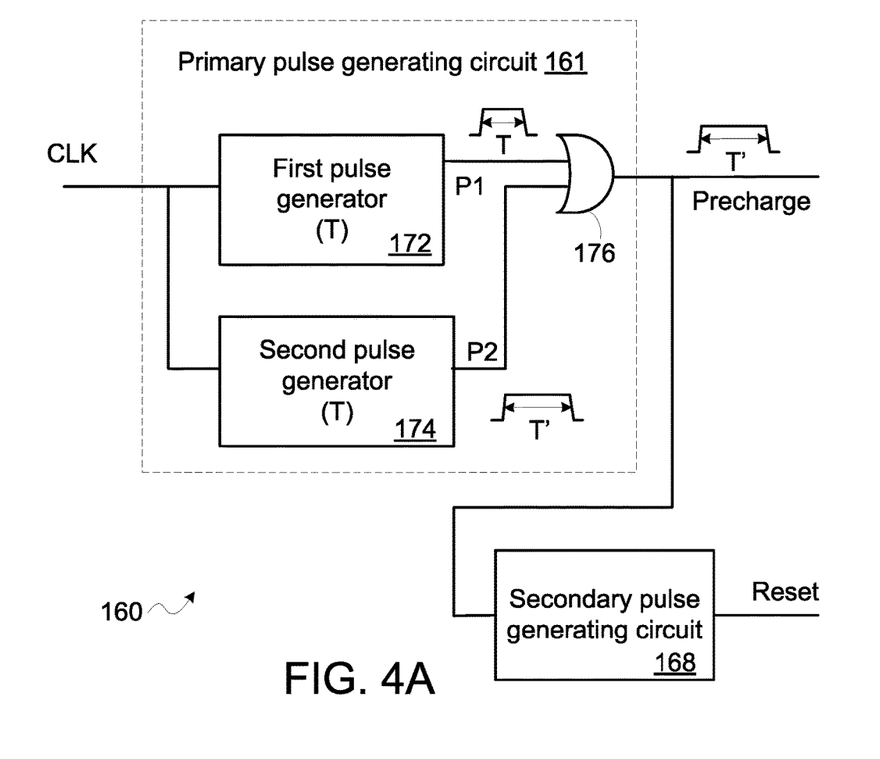
FIG. 4A is a schematic circuit diagram illustrating another example of the timing controller of the non-volatile memory according to the embodiment of the present invention.

FIG. 4A is a schematic circuit diagram illustrating another example of the timing controller of the non-volatile memory according to the embodiment of the present invention. In this embodiment, the timing controller 160 comprises a primary pulse generating circuit 161 and a secondary pulse generating circuit 168.

The primary pulse generating circuit 161 receives the clock signal CLK and generates the precharge signal Precharge according to the rising edge of the clock signal CLK. The secondary pulse generating circuit 168 receives the precharge signal Precharge and generates the reset signal Reset according to the falling edge of the precharge signal Precharge. Consequently, the timing controller 160 generates a pulse of the precharge signal Precharge and a pulse of the reset signal Reset sequentially.

The primary pulse generating circuit 161 comprises a first pulse generator 172 and a second pulse generator 174. The first pulse generator 172 comprises core devices, and the second pulse generator 174 comprises I/O devices. The circuitry of the first pulse generator 172 and the circuitry of the second pulse generator 174 are similar to the circuitry shown in FIG. 2C. That is, each of the first pulse generator 172 and the second pulse generator 174 comprises a logic circuit and a delaying circuit. Each of the logic circuit and the delaying circuit is designed to generate a pulse with a pulse width T.

The decoder 154 and the timing controller 160 of the controlling circuit 150 are formed on the same integrated circuit (IC). If the process variation occurs during the process of fabricating the I/O devices, the decoder 154 and the second pulse generator 174 of the timing controller 160 are both affected. That is, if the I/O devices of the decoder 154 have the SS corner, the I/O devices of the second pulse generator 174 also have the SS corner.

The second pulse generator 174 is expected to generate the pulse of the pulse width T. However, since the I/O devices of the second pulse generator 174 have the SS corner, the pulse width of the second pulse generator 174 is larger than T. The pulse width of the second pulse generator 174 is related to the characteristics of the I/O devices having the SS corner. That is, if the characteristics of the I/O devices of the second pulse generator 174 are inferior, the pulse width is wider.

Please refer to FIG. 4A. The first pulse generator 172 generates a first signal P1 with a pulse width T. The second pulse generator 174 generates a second signal P2 with a pulse width T'. The first signal P1 and the second signal P2 are inputted into an OR gate 176. Consequently, the precharge signal Precharge with the pulse signal T' is outputted from the OR gate 176 of the primary pulse generating circuit 161. In other words, the OR gate 176 can be considered as a determining circuit, and one of the first signal P1 and the second signal P2 having the larger pulse width is used as the precharge signal Precharge.

Figure 4B:
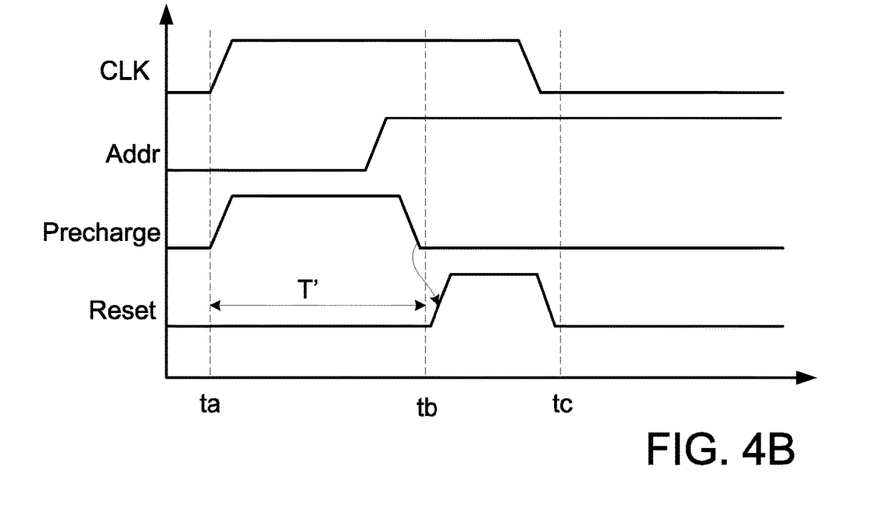
FIG. 4B is a schematic timing waveform diagram illustrating associated signals of the non-volatile memory, in which the I/O devices of the decoder and the timing controller have SS corners.

FIG. 4B is a schematic timing waveform diagram illustrating associated signals of the non-volatile memory, in which the I/O devices of the decoder and the timing controller have SS corners.

At the time point ta corresponding to a rising edge of the clock signal CLK, the processing circuit 152 issues a read command to the decoder 154, and the processing circuit 152 controls the timing controller 160 generates the precharge signal Precharge to the sense amplifier 162.

The time interval between the time point ta and the time point tb is a precharge period. Since the timing of activating the address signal Addr is later and the timing controller 160 widens the pulse width of the precharge signal Precharge to T', the precharge period is extended. Consequently, the decoder still generates the address signal Addr within the precharge period. Furthermore, the sense amplifier 162 pre-charges all of the bit lines BL0~BLn−1 to a first predetermined voltage within the precharge period.

The time interval between the time point tb and the time point tc is a reset period. In the reset period, the sense amplifier 162 determines a selected bit line set from the n bit lines BL0~BLn−1 according to the address signal Addr. In addition, the selected bit line set is reset to a second predetermined voltage by the sense amplifier 162. The voltages of the unselected bit lines are maintained at the first predetermined voltage.

The period after the time point tc is a developing and sensing period. In the developing and sensing period, the memory cells connected with the selected bit line set generate cell currents to the sense amplifier 162. According to the voltage changes of the bit lines of the selected bit line set, the sense amplifier 162 determines the logic levels of the bit lines of the selected bit line set. The logic levels indicate the read data.

Moreover, in case that the I/O devices of the decoder 154 and the second pulse generator 174 have the TT corner, the second signal P2 has the pulse width T. In case that the I/O devices of the decoder 154 and the second pulse generator 174 have the FF corner, the second signal P2 has the pulse width smaller than T. In the above two situations, the precharge signal Precharge with the pulse width T is outputted from the OR gate 176 of the primary pulse generating circuit 161.

From the above descriptions, the timing controller 160 of the non-volatile memory 100 is more advantageous. The first pulse generator 172 of the timing controller 160 comprises the core devices, and the second pulse generator 174 of the timing controller 160 comprises the I/O devices.

In case that the I/O devices of the decoder 154 and the second pulse generator 174 have the SS corner because of the process variation, the pulse width of the pulse from the second pulse generator 174 is changed. Consequently, the pulse width and the precharge period of the precharge signal Precharge are changed. Under this circumstance, the decoder 154 can generate the address signal Addr within the precharge period, and the sense amplifier 162 can accurately generate the read data.

Figure 5:
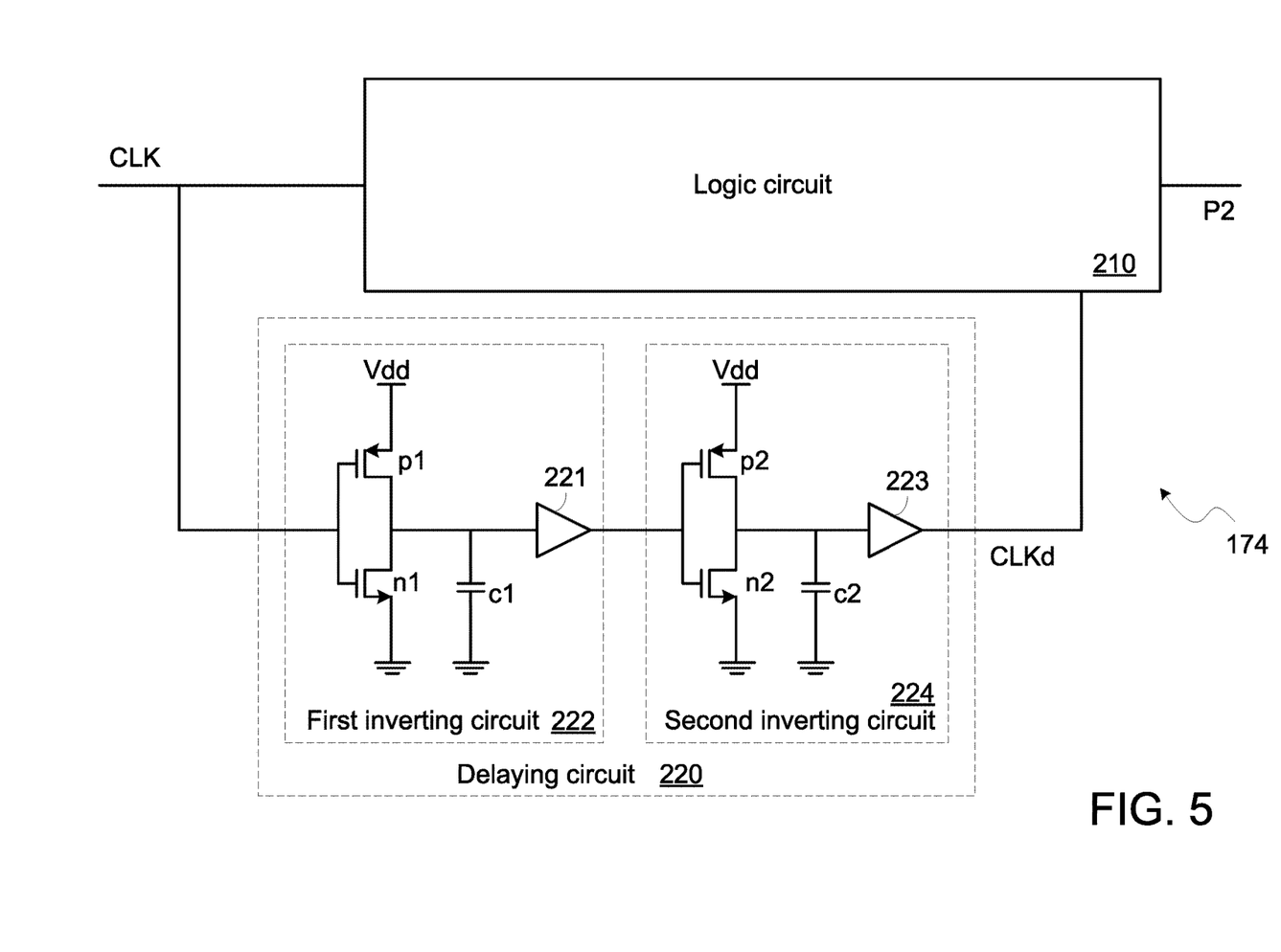
FIG. 5 is a schematic circuit diagram illustrating an example of the second pulse generator of the non-volatile memory according to the embodiment of the present invention.

FIG. 5 is a schematic circuit diagram illustrating an example of the second pulse generator of the primary pulse generating circuit according to the embodiment of the present invention. The second pulse generator 174 comprises I/O devices. In this embodiment, the second pulse generator 174 comprises a logic circuit 210 and a delaying circuit 220. The delaying circuit 220 receives the clock signal CLK. After the clock signal CLK is delayed for a delay time T by the delaying circuit 220, a delayed clock signal CLKd is generated. The logic circuit 210 receives the clock signal CLK and the inverted clock signal CLKb, and generates the second signal P2.

The circuitry of the logic circuit 210 is not restricted. For example, the circuitry of the logic circuit 210 is similar to the circuitry of the logic circuit of FIG. 2C. That is, the logic circuit 210 comprises a NOT gate and a NOR gate. Consequently, the logic circuit 210 generates the second signal P2.

The delaying circuit 220 comprises a first inverting circuit 222 and a second inverting circuit 224. The first inverting circuit 222 and the second inverting circuit 224 are connected with each other in series. An input terminal of the first inverting circuit 222 receives the clock signal CLK. An input terminal of the second inverting circuit 224 is connected with an output terminal of the first inverting circuit 221. An output terminal of the second inverting circuit 224 generates the delayed clock signal CLKd.

The first inverting circuit 222 comprises a PMOS transistor p1, an NMOS transistor n1, a capacitor c1 and a buffer 221. The second inverting circuit 224 comprises a PMOS transistor p2, an NMOS transistor n2, a capacitor c2 and a buffer 223. By adjusting the capacitance values of the capacitors c1 and c2, the delay time of the delaying circuit 220 is controlled. Consequently, the pulse width of the second signal P2 is correspondingly adjusted.

The source terminal of the PMOS transistor p1 is connected with a voltage source Vdd. The gate terminal of the PMOS transistor p1 is connected with the input terminal of the first inverting circuit 222. The source terminal of the NMOS transistor n1 is connected with a ground terminal. The gate terminal of the NMOS transistor n1 is connected with the input terminal of the first inverting circuit 222. The drain terminal of the NMOS transistor n1 is connected with the drain terminal of the PMOS transistor p1. A first terminal of the capacitor c1 is connected with the drain terminal of the PMOS transistor p1. A second terminal of the capacitor c1 is connected with the ground terminal. An input terminal of the buffer 221 is connected with the drain terminal of the PMOS transistor p1. An output terminal of the buffer 221 is the output terminal of the first inverting circuit 222.

The source terminal of the PMOS transistor p2 is connected with the voltage source Vdd. The gate terminal of the PMOS transistor p2 is connected with the output terminal of the first inverting circuit 222. The source terminal of the NMOS transistor n2 is connected with the ground terminal. The gate terminal of the NMOS transistor n2 is connected with the output terminal of the first inverting circuit 222. The drain terminal of the NMOS transistor n2 is connected with the drain terminal of the PMOS transistor p2. A first terminal of the capacitor c2 is connected with the drain terminal of the PMOS transistor p2. A second terminal of the capacitor c2 is connected with the ground terminal. An input terminal of the second buffer 223 is connected with the drain terminal of the PMOS transistor p2. An output terminal of the buffer 223 is the output terminal of the second inverting circuit 224.

In an embodiment, the PMOS transistor p1 of the first inverting circuit 222 is a weak PMOS transistor, and the NMOS transistor n2 of the second inverting circuit 224 is a weak NMOS transistor. Consequently, the pulse width of the second pulse generator 174 is highly correlated with the characteristics of the I/O devices having the SS corner. In another embodiment, the NMOS transistor n1 of the first inverting circuit 222 is a weak NMOS transistor, and the PMOS transistor p2 of the second inverting circuit 224 is a weak PMOS transistor.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A non-volatile memory, comprising:
   a memory array comprising plural word lines and plural bit lines; and
   a controlling circuit connected with the plural word lines and the plural bit lines, wherein the controlling circuit comprises:
   a processing circuit, wherein the processing circuit generates a read command according to a signal edge of a clock signal;
   a decoder connected with the processing circuit, wherein the decoder receives the read command and generates an address signal;
   a driver connected with the plural word lines, and activating one of the plural word lines according to the address signal;
   a timing controller connected with the processing circuit, wherein when the processing circuit generates the read command, the timing controller generates a precharge signal and a reset signal sequentially; and a sense amplifier connected with the plural bit lines, wherein when the precharge signal is activated, the sense amplifier pre-charges the plural bit lines to a first predetermined voltage, wherein when the reset signal is activated, the sense amplifier determines a selected bit line set from the plural bit lines and adjusts the selected bit line set to a second predetermined voltage, wherein the decoder comprises a first type of devices, and the timing controller comprises the first type of devices and a second type of devices; and wherein the timing controller comprises: a primary pulse generating circuit for generating the precharge signal according to the signal edge of the clock signal, wherein the precharge signal has a first pulse, and a pulse width of the first pulse is a precharge period; and a secondary pulse generating circuit connected with the primary pulse generating circuit, wherein after the precharge period, the secondary pulse generating circuit generates the reset signal, wherein the reset signal has a second pulse, and a pulse width of the second pulse is a reset period.

2. The non-volatile memory as claimed in claim 1, wherein the first type of devices are devices capable of withstanding a high voltage stress, and the second type of devices are devices capable of withstanding a low voltage stress.

3. The non-volatile memory as claimed in claim 1, wherein the first type of devices are I/O devices, and the second type of devices are core devices.

4. The non-volatile memory as claimed in claim 1, wherein the primary pulse generating circuit comprises:
a first pulse generator receiving the clock signal and generating a first signal;
a second pulse generator receiving the clock signal and generating a second signal; and
a determining circuit for determining one of the first signal and the second signal as the precharge signal, wherein if a pulse width of the first signal is larger than a pulse width of the second signal, the first signal is used as the precharge signal, wherein if the pulse width of the first signal is smaller than the pulse width of the second signal, the second signal is used as the precharge signal.

5. The non-volatile memory as claimed in claim 4, wherein the first pulse generator comprises the second type of devices, and the second pulse generator comprises the first type of devices.

6. The non-volatile memory as claimed in claim 4, wherein the second pulse generator comprises:
a delaying circuit for receiving the clock signal and generating a delayed clock signal; and
a logic circuit for receiving the clock signal and the delayed clock signal and generating the second signal.

7. The non-volatile memory as claimed in claim 6, wherein the delaying circuit comprises:
a first inverting circuit, wherein an input terminal of the first inverting circuit receives the clock signal; and
a second inverting circuit, wherein an input terminal of the second inverting circuit is connected with an output terminal of the first inverting circuit, and an output terminal of the second inverting circuit generates the delayed clock signal.

8. The non-volatile memory as claimed in claim 7, wherein the first inverting circuit comprises:
a first PMOS transistor, wherein a source terminal of the first PMOS transistor is connected with a voltage source, and a gate terminal of the first PMOS transistor is connected with the input terminal of the first inverting circuit;
a first NMOS transistor, wherein a source terminal of the first NMOS transistor is connected with a ground terminal, a gate terminal of the first NMOS transistor is connected with the input terminal of the first inverting circuit, and a drain terminal of the first NMOS transistor is connected with a drain terminal of the first PMOS transistor;
a first capacitor, wherein a first terminal of the first capacitor is connected with the drain terminal of the first PMOS transistor, and a second terminal of the first capacitor is connected with the ground terminal; and
a first buffer, wherein an input terminal of the first buffer is connected with the drain terminal of the first PMOS transistor, and an output terminal of the first buffer is the output terminal of the first inverting circuit.

9. The non-volatile memory as claimed in claim 8, wherein the second inverting circuit comprises:
a second PMOS transistor, wherein a source terminal of the second PMOS transistor is connected with the voltage source, and a gate terminal of the second PMOS transistor is connected with the output terminal of the first inverting circuit;
a second NMOS transistor, wherein a source terminal of the second NMOS transistor is connected with the ground terminal, a gate terminal of the second NMOS transistor is connected with the output terminal of the first inverting circuit, and a drain terminal of the second NMOS transistor is connected with a drain terminal of the second PMOS transistor;
a second capacitor, wherein a first terminal of the second capacitor is connected with the drain terminal of the second PMOS transistor, and a second terminal of the second capacitor is connected with the ground terminal; and
a second buffer, wherein an input terminal of the second buffer is connected with the drain terminal of the second PMOS transistor, and an output terminal of the second buffer is the output terminal of the second inverting circuit.

10. The non-volatile memory as claimed in claim 9, wherein the first PMOS transistor is a weak PMOS transistor, and the second NMOS transistor is a weak NMOS transistor.

11. The non-volatile memory as claimed in claim 9, wherein the first NMOS transistor is a weak NMOS transistor, and the second PMOS transistor is a weak PMOS transistor.

12. The non-volatile memory as claimed in claim 1, wherein after the reset period and in a developing and sensing period, the sense amplifier determines logic levels of the selected bit line set according to voltage changes of the selected bit line set, wherein the logic levels of the selected bit line set indicates a read data.

* * * * *